(No Model.)
M. B. MILLS.
CAR BRAKE.
No. 381,571. Patented Apr. 24, 1888.
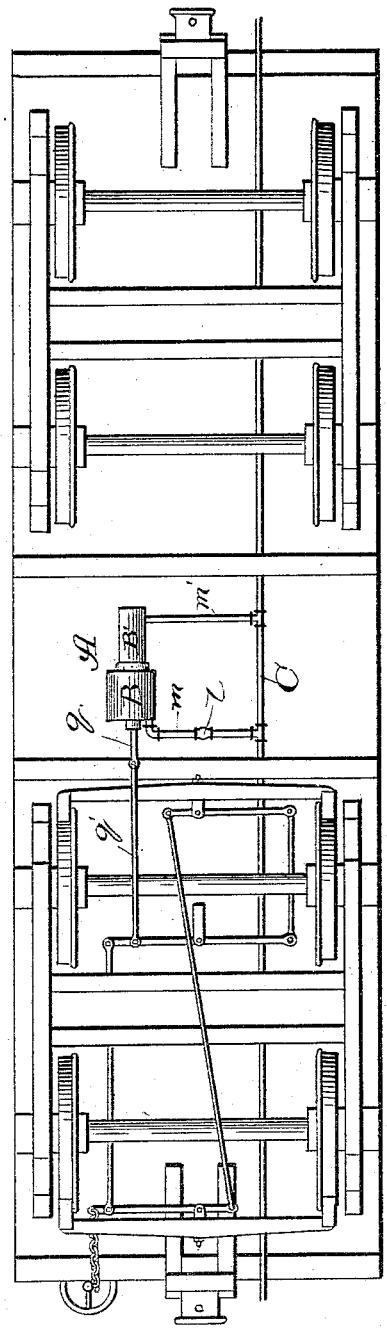
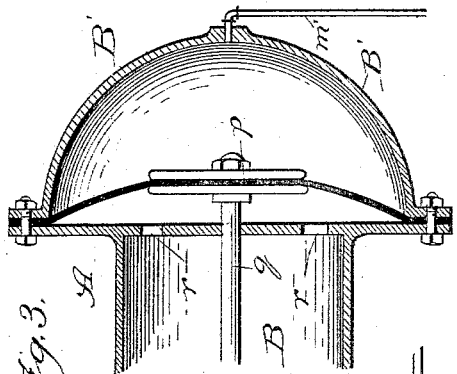
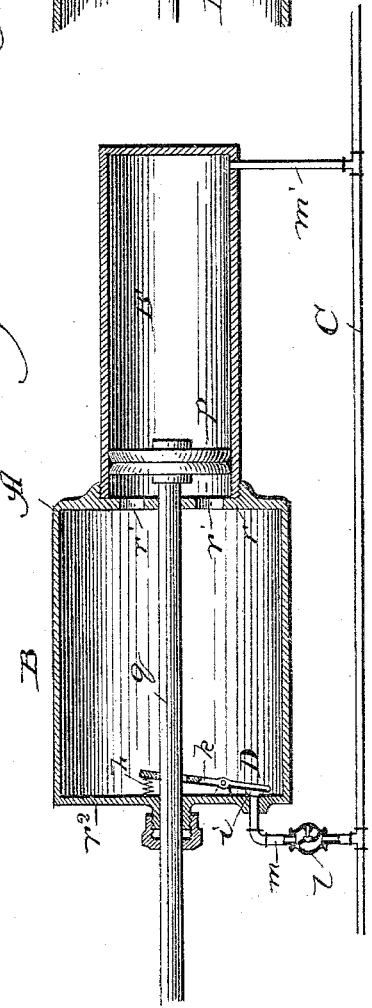
Witnesses:
Chas. Gaylord.
J. K. Dyrenforth.
Inventor:
Mortimer B. Mills,
By Dyrenforth & Dyrenforth
Att'ys

UNITED STATES PATENT OFFICE.

MORTIMER B. MILLS, OF CHICAGO, ILLINOIS.

CAR-BRAKE.

SPECIFICATION forming part of Letters Patent No. 381,571, dated April 24, 1888.

Application filed November 29, 1887. Serial No. 256,452. (No model.)

*To all whom it may concern:*

Be it known that I, MORTIMER B. MILLS, a citizen of the United States, residing at Chicago, in the county of Cook and State of Illinois, have invented a new and useful Improvement in Car-Brakes, of which the following is a specification.

My invention relates to an improvement in the class of brakes for railway-cars operated by compressed air; and it has for its object the provision of simple but effective means for the purpose.

In the drawings, Figure 1 is a bottom plan view of a car provided with my improvement; Fig. 2, an enlarged broken sectional view showing my improved device in side elevation, and Fig. 3 a broken view showing a modified detail.

A is the cylinder comprising the part B and the part B', shown narrower than the part B to enable the piston-head $p$, hereinafter described, to fit it, but not necessarily so, as both may be of the same diameter. The end of the part B, to which the open end of the part B' is joined, is provided with a head or diaphragm, $r$, having perforations $r'$, affording communication between the two parts, and through the center of the head $r$ the piston-rod $q$ extends from the piston $p$, which is in the part or chamber B' of the cylinder and of the common double construction shown, to insure a tight fit and prevent communication, by leakage around it, between the divisions it produces in the cylinder A. The piston-rod $q$ extends through the end or head $r^2$ of the chamber B of the cylinder, where it is suitably packed, as shown. The piston-rod $q$ (which thus has bearings in the heads $r$ and $r^2$, whereby the former prevents the piston from bearing its weight against the inner side of the chamber B') is connected by a pivotal link, $q'$, with the lever mechanism of the brakes, as shown in Fig. 1, in a manner to cause the brakes to be set by a "pull"—that is, when the piston is forced in a direction away from the perforated diaphragm $r$ and released with the opposite movement of the piston. This is, however, arbitrary, since the device may be arranged to operate the reverse of the manner stated.

Detailed description of the lever mechanism of the brakes is not given, as it is old in itself and readily comprehensible from the illustration thereof in Fig. 1.

C is the "air-pipe," so called, which is the conduit provided to extend longitudinally along the bottom of each car, those on the respective cars of a train being coupled together between cars, and which is caused to communicate at will, and in a well-known manner and by well-known means, with the air-pressure supply from the locomotive or with the open air for the purpose of exhaust. The chamber B' of the cylinder A has open or unobstructed communication through a branch pipe or opening, $m'$, with the pipe C, with which latter it corresponds in diameter, from one side of the piston, and the chamber B communicates from the opposite side of the piston with the pipe C through a branch pipe or opening, $m$, also corresponding in diameter with the pipe C, and containing a check-valve, $l$, which opens only in an inward direction in the sense that it opens with pressure exerted toward its side nearest the pipe C. The opening in the chamber B of the cylinder, into which the branch pipe $m$ leads, is maintained normally closed by a valve, D, which may comprise a lever, $k$, pivotally supported on the inner side of the head $r^2$ and carrying near one end a cushion or stopper, $i$, coincident with the inlet-opening, and a spring, $h$, tends to force the lever inward toward its opposite end, and thereby maintain with an appreciable force, which may be predetermined, the stopper portion $i$ against the inlet-opening. It may be stated in this connection, however, and will be readily understood from the description hereinafter contained of the operation of the device, that the desired resistance to pressure into the chamber B of the cylinder could be provided by affording it in the check-valve $l$ in any suitable manner, thereby dispensing with the lever device D.

The operation is as follows: It may be stated at the outset that the position, or substantially the position, of the piston $p$ (shown in Fig. 2) is normal, according to the aforesaid arbitrary arrangement, in which the parts of the lever mechanism of the brakes are in the normally relative positions shown in Fig. 1 and the brakes are released or "off." This normal position of the piston is maintained by equal, or substantially equal, air-pressure on its opposite sides, produced as follows: When air from the pressure-supply for the initial charge is admitted to the conducting air-pipe C, it enters the chambers B' and B of the cylinder on opposite sides of the piston, respectively, through the inlets $m'$ and $m$, but with a greater pressure into the former than into the latter, owing to the normal resistance of the valve D by the spring $h$, or to the check-valve $l$, if the resistance shall be afforded by it and the valve D omitted, so that there will always, when pressure is admitted at both sides of the piston, be an excess in the chamber B' over that in the chamber B equivalent to the resistance at the inlet $m$. If the pressure-supply be eighty-five pounds and the resistance of the valve D or its equivalent, say, five, but seventy-five pounds can enter the chamber B, while eighty will enter B', though the seventy-five pounds in the former and the resistance of the valve thereof will close it against or counterbalance further pressure from the pipe C. Hence, if the chamber B is absolutely air-tight and the condition of the air remains unaffected, with the same pressure from the supply, the initial charge of the chamber B will always remain, and this chamber could be a close chamber in the sense of being air-tight after being supplied with the initial charge, one end of which would be the movable wall afforded by the piston. Thus, with a pressure of, say, eighty pounds on one side of the piston and of, say, seventy-five pounds on the opposite side thereof, the brakes are normally maintained off. To set them, the pipe C is caused to communicate (by turning a suitable valve) with the open air, thereby exhausting the contents of the chamber B' and causing the pressure in the chamber B on the opposite side of the piston to force the latter in the direction away from the perforated head $r$, thereby pulling the brake-levers to set the brakes. The setting of the brakes is obviously not ultimately accomplished with the full initial pressure in the chamber B, since with the exhaustion of the pressure from the chamber B' the air in the former expands, and thus gradually reduces the pressure, say, to fifty pounds; but the initial pressure is again eventually produced in the chamber B by the reverse movement of the piston to release the brakes, which is accomplished on opening communication of the pipe C with the pressure-supply, (at the same time closing that with the outer air,) whereby a gradually-increasing pressure enters the chamber B' until it equals that (say fifty pounds, as aforesaid) on the opposite side of the piston, (in the chamber B,) after which by continual increase up to the force of the pressure-supply (say eighty pounds) it moves the piston toward its normal position, thereby compressing the air in the chamber B to its initial degree of pressure. In the meantime it is impossible for pressure from the pipe C to enter the chamber B through the inlet $m$, since the valve D or its equivalent always insures a resistance, which for the purpose practically amounts to an increase of pressure in the chamber B over that in the chamber B' until, by the compression in or toward the former by the movement of the piston, the pressure is equalized in each chamber to the requirement of the chamber B, when the "practical" excess referred to in the last-named chamber by the resistance of the valve device will have been reduced to a practical equality of pressure against the counter-pressure from the pipe C in the branch pipe $m$.

When my improved apparatus is provided on several cars in a train, and properly coupled between cars, the operation is of course the same as that described in connection with a single car.

It will be seen that leakage around the piston-head, if originally of sufficiently-tight fit, is not liable to result, since the pressure on each side, being normally substantially equal, there is no such excess of pressure on one side as would tend to force a passage to the other between the periphery or edge of the piston and inner wall of the chamber containing it. If desired, for some connections in which my improved device may be used the piston $p$ may be a rubber diaphragm, operated like the piston by a rod, $q$. This construction is represented in Fig. 3, in which B' represents the feature corresponding with it in the other figures, and $p$ the diaphragm substitute for the piston.

What I claim as new, and desire to secure by Letters Patent, is—

1. The combination of a cylinder, A, having an opening, $m$, and an opening, $m'$, adapted to communicate with the air-pipe which leads from the compressed-air supply of an atmospheric car-brake device, a valve, D, in the cylinder, comprising a pivotal lever, $k$, and stopper $i$, a spring, $h$, operating to hold the stopper $i$ normally in position to close the opening $m$, and a piston in the cylinder between the openings $m$ and $m'$ and adapted to be connected with the car-brakes, substantially as and for the purpose set forth.

2. The combination of a cylinder, A, comprising a chamber, B, having a perforated head, $r$, and a chamber, B', having an open end at which it is secured to the chamber B at the end provided with the perforated head, a piston within the chamber B', adapted to be connected with the brakes of a car, an opening in the chamber B, provided with a suitable valve and adapted to afford controllable communication of the said chamber with the air-pipe leading from the compressed-air supply, and an opening in the chamber B', adapted to afford open communication with the said air-pipe, substantially as and for the purpose set forth.

3. The combination of a cylinder, A, comprising a chamber, B, having a perforated head, $r$, and a chamber, B', having an open end at which it is secured to the chamber B at the end provided with the said perforated head, a piston within the chamber B', adapted to be connected with the brakes of a car, an opening, $m$, in the chamber B, a valve, D, maintained normally by a yielding pressure against the opening $m$ to close it, and an opening, $m'$, in the chamber B', the openings $m$ and $m'$ being adapted to be connected with the air pipe which leads from the compressed-air supply, substantially as described.

4. The combination of a cylinder, A, comprising a chamber, B, having a perforated diaphragm, $r$, a chamber, B', having an open end at which it is secured to the chamber B at the end provided with the perforated head, openings $m$ and $m'$, respectively, in the chambers B and B' and adapted to communicate with the air-pipe which leads from the compressed-air supply of an atmospheric car-brake device, a valve, D, in the chamber B, comprising a pivotal lever, $k$, and stopper $i$, a spring, $h$, operating to hold the stopper $i$ normally in position to close the opening $m$, and a piston, $p$, in the cylinder between the openings $m$ and $m'$, provided with a rod, $q$, supported in the heads $r$ and $r^2$ and adapted to be connected with the car-brakes, substantially as and for the purpose set forth.

MORTIMER B. MILLS.

In presence of—
  J. W. DYRENFORTH,
  C. E. GORTON.